United States Patent [19]

Kjendalen et al.

[11] Patent Number: 5,219,267
[45] Date of Patent: Jun. 15, 1993

[54] METHOD FOR SALVAGING THE CONTENTS OF A LEAKING DRUM

[75] Inventors: Curtis E. Kjendalen, Marion; LeDell E. Benson, Clintonville, both of Wis.

[73] Assignee: Marion Body Works, Inc., Marion, Wis.

[21] Appl. No.: 837,530

[22] Filed: Feb. 18, 1992

[51] Int. Cl.⁵ .......................... B66C 23/04; B60P 1/46
[52] U.S. Cl. ..................... 414/786; 414/545; 212/223; 212/253; 212/270
[58] Field of Search ............. 414/467, 472, 495–496, 414/539–540, 542, 543, 545, 557, 566, 591, 592, 607, 618, 619, 403–404, 408–409, 558, 786, 910, 912

[56] References Cited

U.S. PATENT DOCUMENTS

| | | | |
|---|---|---|---|
| 2,760,661 | 8/1956 | Wight et al. | 414/607 |
| 3,578,179 | 5/1971 | Jujioka | 212/180 |
| 3,774,788 | 11/1973 | Sowers et al. | 414/543 |
| 4,073,175 | 2/1978 | Seaman | 414/607 |
| 4,940,381 | 7/1990 | Rysewyk | 414/619 |

FOREIGN PATENT DOCUMENTS

| | | | |
|---|---|---|---|
| 868814 | 5/1961 | United Kingdom | 414/607 |
| 1046886 | 10/1966 | United Kingdom | 212/177 |
| 2132582 | 7/1984 | United Kingdom | 414/545 |

Primary Examiner—Joseph F. Peters, Jr.
Assistant Examiner—R. B. Johnson
Attorney, Agent, or Firm—Foley & Lardner

[57] ABSTRACT

An apparatus for transferring leaking drums to a salvage drum utilizing a liftgate assembly having a vertical rail for supporting a liftgate and a drive mechanism for raising and lowering the vertical rail, the apparatus including a lift boom assembly having a chain mounted thereon with a drum lifting clamp secured to the chain for engaging the leaking drum and a pair of tubular pocket assemblies mounted in a vertically spaced relation on the vertical rail and a pair of pin assemblies mounted on the lift boom assembly for matingly engaging the pocket assembly whereby the lift boom assembly can be pivoted with respect to the liftgate assembly and removed for storage in the vehicle.

1 Claim, 3 Drawing Sheets

METHOD FOR SALVAGING THE CONTENTS OF A LEAKING DRUM

FIELD OF THE INVENTION

The present invention relates to a salvaging apparatus and method for containing a leaking drum and more particularly to an auxiliary boom assembly which can be stored in the vehicle.

BACKGROUND OF THE INVENTION

Storage drums for various liquids are transported on the back of vehicles. During transit or at the customer's work place the drums or barrels can be damaged and sometimes causing leaks to occur in the drums. When this occurs the contents of the drum are lost due to the inability of the driver to repair the drum at the customer's work place or in transit. The vehicle generally includes a rail type liftgate which is actuated by an electrohydraulic assembly. The liftgate includes a vertical rail which is used to raise and lower the liftgate.

SUMMARY OF THE PRESENT INVENTION

In accordance with the present invention a cantilever arm assembly is stored on the truck and removed from storage and mounted on the vertical rail of the liftgate when a leaking drum is discovered. The cantilever arm assembly includes an eye bolt, a chain mounted on the eye bolt and a safety hook mounted on the end of the chain. A drum lifting clamp is attached to the safety hook. The clamp can be used to lift any of a number of different size drums. When a leaking drum is found on the back of the truck, the drum is moved to the liftgate, lowered to the ground, and removed from the liftgate platform. The cantilever arm assembly is mounted on the vertical rail of the liftgate. The cantilever arm is mounted at an offset angle so the liftgate platform does not have to be folded (stored in the "closed" position) for the arm to function. The leaking drum is positioned under the boom of the cantilever arm assembly. The lifting clamp is attached to the lip around the top of the leaking drum. The electrohydraulic lift mechanism on the rail type liftgate is actuated to raise the vertical rail and lift the leaking drum off of the ground. A salvage drum is positioned beneath the leaking drum and the leaking drum lowered into the salvage drum. After the leaking drum is sealed in the salvage drum the cantilever arm assembly is returned to the storage box on the vehicle and the salvage drum is moved onto the liftgate and lifted up for placement in the truck.

The principal feature of the invention is the utilization of the liftgate to raise and lower the leaking drum into the salvage drum.

Another of the principal features of the invention is the provision of a lift boom stored on a vehicle for salvaging a leaking drum while in transit or before loading onto the truck.

This lift boom has no moving parts, is simplier in design, lighter weight, and less expensive than existing boom lifting systems that do not utilize the liftgate power.

Another principal feature of the invention is provision of a mounting arrangement that simplifies the mounting and removal of the lift boom on the vertical rail of the liftgate assembly. By removing the assembly after use, it is safely stored and the overall width of the truck does not increase.

Another principal feature of the invention is that it permits a single driver to perform the needed encapsulation of a leaking drum which avoids the cost of having to hire two drivers. It also permits the needed encapsulation to be done safely.

Other principal features and advantages of the invention will become apparent to those skilled in the art upon review of the following drawings, the detailed description and the appended claims.

Figure 1:
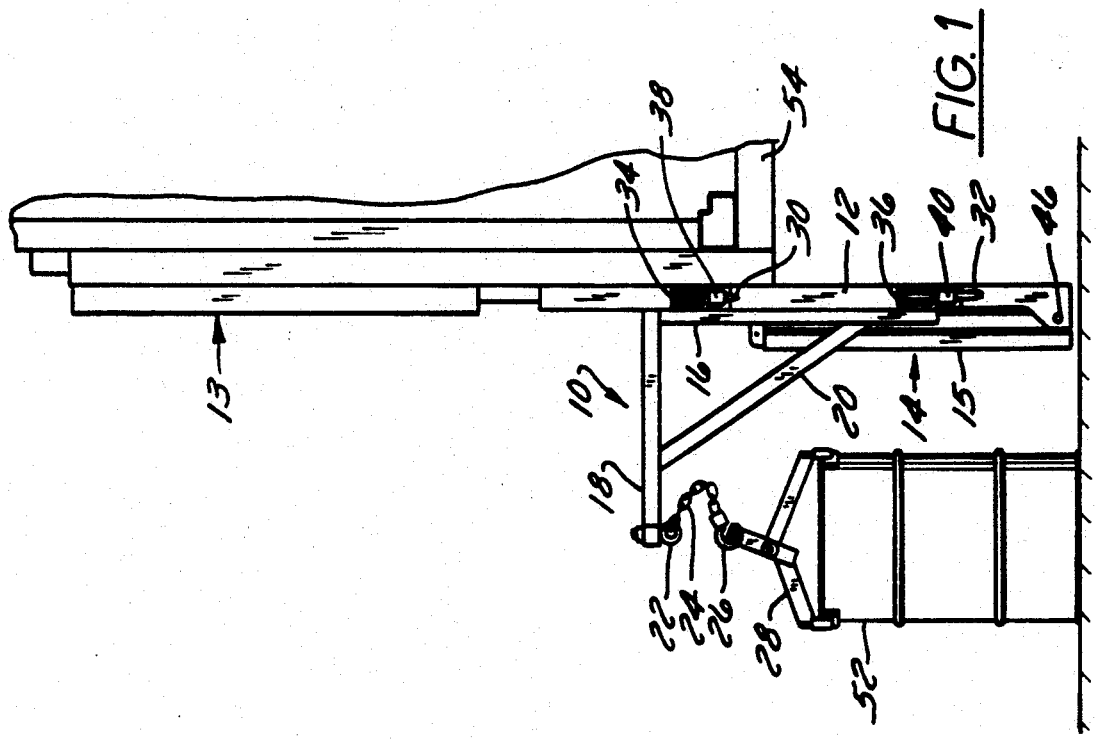
FIG. 1 is a view showing the lift boom mounted on the vertical rail of the liftgate in a position to lift a drum.
Figure 2:
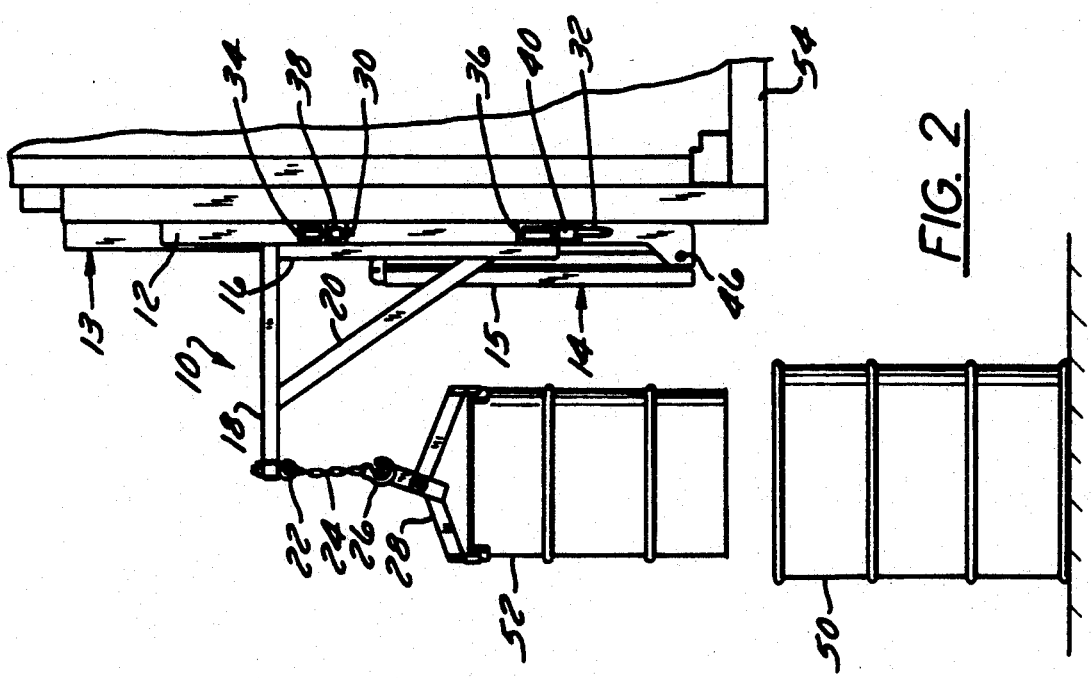
FIG. 2 is a view showing the lift boom in an elevated position with the leaking drum suspended over a salvage drum.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

The lift boom 10 according to the present invention is mounted on the vertical rail 12 of a liftgate assembly 14 of the type generally mounted on the back of a truck. The liftgate assembly 14 includes an electrohydraulic lift mechanism 13 for raising and lowering the vertical rail 12 of the liftgate assembly 14.

Figure 4:
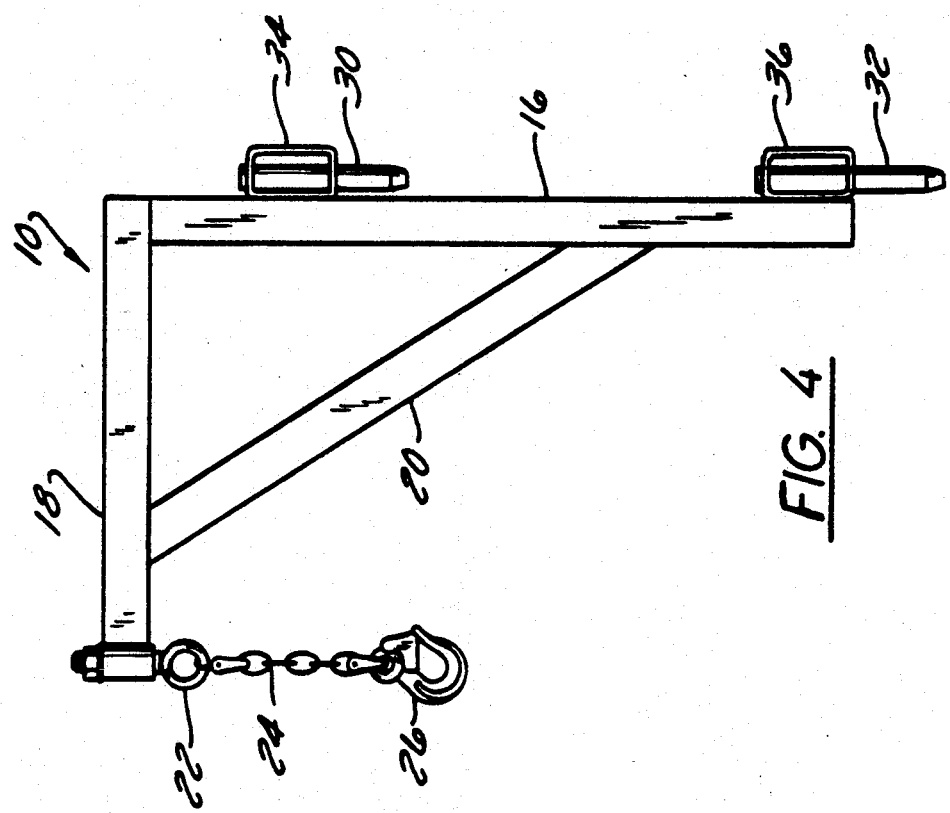
FIG. 4 is a side elevation view of the lift boom assembly.
Figure 3:
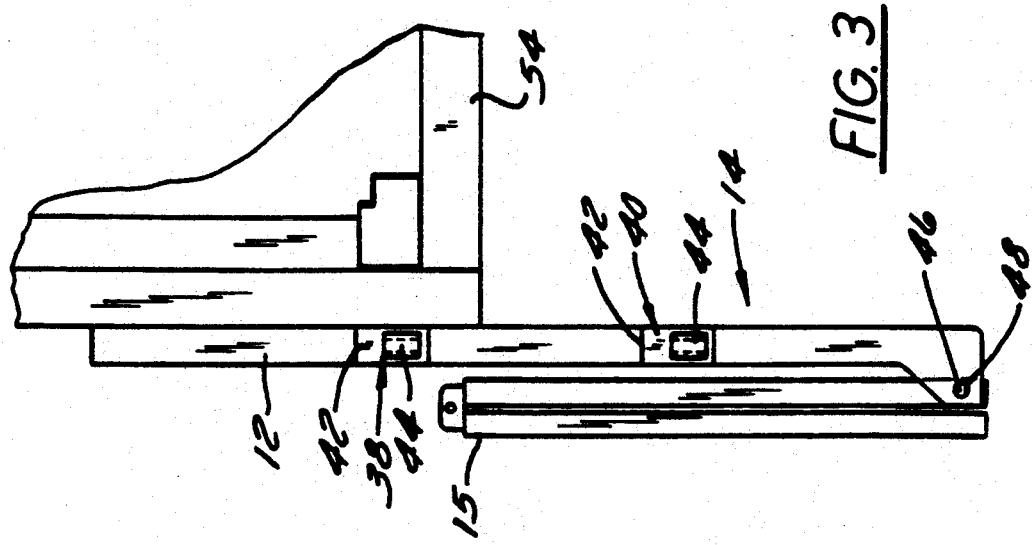
FIG. 3 is a view showing the location of the pockets for supporting the lift boom assembly on the vertical rail.

The lift boom assembly 10 as shown in FIG. 4 includes a main beam 16, a boom 18 secured to the upper end of the beam 16 and a support beam 20 secured to one side of the main beam 16 and to the bottom of the boom 18. A liftgate 15 is pivotally mounted on a pivot shaft 46 secured to the bottom of the vertical rail 12. An eye bolt 22 is pivotally mounted on the end of the boom 18 for supporting a chain 24. A safety hook 26 is provided on the end of the chain 24 to engage a drum lifting clamp 28.

Figure 5:
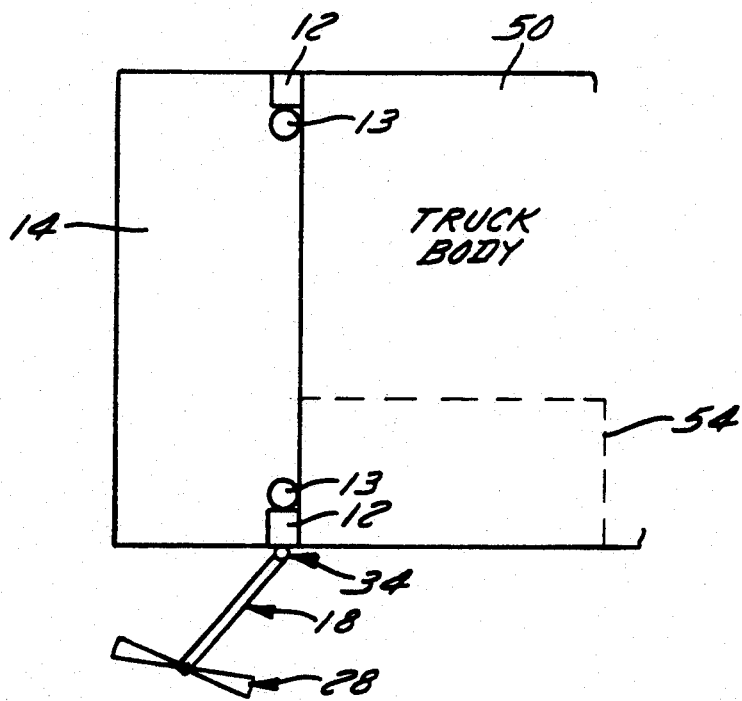
FIG. 5 is a top plan view of a position of the truck showing the position of the lift boom assembly.

The lift boom assembly 10 is supported on the vertical rail 12 of the liftgate assembly 14 by means of pins 30 and 32 which are secured to the beam 16 by box beam sections 34 and 36, respectively, which hold the boom assembly at an angle as shown in FIG. 5. It should be noted that the lower pin 32 is longer than the upper pin 30 to aid in mounting the boom assembly 10 on the rail 12.

The lift boom assembly 10 is supported on the vertical rail 12 by means of pocket assemblies 38 and 40 generally located on the curb side of the vertical rail 12. Each pocket assembly includes a mounting plate 42 and a tubular member 44. The lower pocket assembly 40 is tack welded to the vertical rail 12 with the top of the tubular member 44 located a predetermined distance from the axis 46 of the bottom platform pivot shaft 48.

The upper pocket assembly 38 is tack welded to the vertical rail 12 with the top of the tubular member 44 located a predetermined distance from the top of the tubular member 44 of the lower pocket assembly member 40. The distance between the top of the tubular members 44 should be equal to the distance between the bottom of the box beam sections 34 and 36 on the beam 16.

The pocket assemblies 38 and 40 are aligned on the vertical rail 12 by inserting a rod through the tubular members 44 so that they are vertically aligned. The plates 42 are then welded to the vertical rail 12.

Mounting the boom assembly 10 on the vertical rail 12 is simplified by making the lower pin 32 longer than the upper pin 30. The lower pin 32 can then be initially aligned in the lower tubular member 44 before the upper pin 30 is aligned in the upper tubular member 44. With this arrangement the upper pin 30 is automatically aligned with the upper member 44 as the lower pin 32 is aligned in the lower member 44. It should be noted, as shown in FIG. 5, that the boom extends outwardly at an angle to the side of the truck. With this arrangement the lift gate may be left in the up or down position when using the boom assembly 10.

When not in use the lift boom assembly 10 is normally stored in the storage box 54 provided on the passenger side of the vehicle. The lift boom assembly 10 is removed from the storage box 54 and mounted on the vertical rail by inserting the lower tapered pin 32 into the corresponding pocket assembly 40 and the upper tapered pin 30 in the upper assembly 38. The leaking drum 52 is moved under the drum lifting clamp 28 on the boom assembly. The clamp 28 is secured to the lip of the drum 52. A salvage drum 50 is positioned next to the leaking drum 52. The leaking drum 52 is then lifted by actuating the electrohydraulic system to raise the vertical rail 12 on the back of the vehicle. When the leaking drum 52 has been raised enough to clear the salvage drum 50, the salvage drum 50 is moved under drum 52 on the lift boom assembly. The drum 52 is then lowered into the salvage drum 50 and unhooked from the drum lifter 28. The lift boom assembly 10 is then lifted off of the pocket assemblies 38 and 40 and returned to the storage box 54. The cover is locked on the salvage drum 52 and the salvage drum is moved by handcart onto the liftgate assembly 14 for movement into the vehicle.

Thus, it should be apparent that there has been provided in accordance with the present invention a salvage apparatus for leaking drums that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A method for salvaging the contents of a leaking drum utilizing a truck having a liftgate assembly mounted on the truck, the liftgate assembly including a vertical rail and an electrohydraulic lift system for raising and lowering said vertical rail, the method including the steps of mounting a cantilever boom on the vertical rail,
moving the leaking drum from the truck to a position on the ground beneath the boom,
securing the drum to the boom,
raising the vertical rail to lift the leaking drum off the ground,
positioning a salvage drum having an inside diameter greater than the leaking drum under the leaking drum,
lowering the vertical rail to deposit the leaking drum in the salvage drum, and
moving the salvage drum onto the truck.

* * * * *